(12) United States Patent
Zeng et al.

(10) Patent No.: US 9,365,983 B2
(45) Date of Patent: Jun. 14, 2016

(54) ONSITE STEEL RAIL LASER PROCESSING VEHICLE

(71) Applicants: Wuhan NRD Laser Engineering Co., Ltd, Wuhan (CN); HUAZHONG UNIVERSITY OF SCIENCE AND TECHNOLOGY, Wuhan (CN)

(72) Inventors: Xiaoyan Zeng, Wuhan (CN); Qianwu Hu, Wuhan (CN); Chongyang Li, Wuhan (CN); Yinlan Zheng, Wuhan (CN); Min Du, Wuhan (CN)

(73) Assignees: HUAZHONG UNIVERSITY OF SCIENCE AND TECHNOLOGY, Wuhan (CN); WUHAN NRD LASER ENGINEERING CO., LTD, Wuhan (CN)

( * ) Notice: Subject to any disclaimer, the term of this patent is extended or adjusted under 35 U.S.C. 154(b) by 0 days.

(21) Appl. No.: 14/375,970

(22) PCT Filed: Jun. 13, 2013

(86) PCT No.: PCT/CN2013/077200
§ 371 (c)(1),
(2) Date: Jul. 31, 2014

(87) PCT Pub. No.: WO2014/005478
PCT Pub. Date: Jan. 9, 2014

(65) Prior Publication Data
US 2015/0020707 A1    Jan. 22, 2015

(30) Foreign Application Priority Data

Jul. 5, 2012 (CN) .......................... 2012 1 0229833

(51) Int. Cl.
*B60F 1/00* (2006.01)
*E01B 31/18* (2006.01)
(Continued)

(52) U.S. Cl.
CPC . *E01B 31/18* (2013.01); *B60F 1/00* (2013.01); *B61D 15/00* (2013.01); *B61K 9/08* (2013.01); *B60F 1/04* (2013.01); *B60F 2301/02* (2013.01); *B60F 2301/10* (2013.01)

(58) Field of Classification Search
CPC .............. E01B 31/18; B60F 1/00; B60F 1/04; B60F 2301/02; B60F 2301/10; B61K 9/08; B61D 15/00
See application file for complete search history.

(56) References Cited

U.S. PATENT DOCUMENTS 8,316,774 B1 * 11/2012 Coots ...................... B61C 11/00
105/215.2
2002/0099507 A1 * 7/2002 Clark ....................... B61K 9/10
702/36
(Continued)

FOREIGN PATENT DOCUMENTS

CN          1434170 A     8/2003
CN        101403030 A     4/2009

*Primary Examiner* — Jason C Smith
(74) *Attorney, Agent, or Firm* — Davis Wright Tremaine LLP

(57) ABSTRACT

The invention discloses an on-line laser processing vehicle for a rail, including a chassis, a vehicle body, a steer-control chamber and a container; the steer-control chamber includes a console, a CCD monitoring system and a drive-switching operating system; a dual driving system and switching mechanism, which with a process-operation driving system, a conventional operation driving system and a switching mechanism, is disposed in the container; the process-operation driving system operates to provide driving power for the laser processing vehicle during laser processing, and precisely controls moving speed and distance of the laser processing vehicle; the switching mechanism operates to implement switching between the conventional operation driving system and the process-operation driving system. The invention ensures accurate processing trajectories of the laser processing vehicle during laser processing; facilitates on-line laser processing of a variety of rails, such as the rails of main line, curved rails, guard rails, switch rails and so on, so that wear resistance of the processed rail is greatly improved, and meets requirements of high-speed and heavy haul trains for wear resistance of the rail.

12 Claims, 11 Drawing Sheets

(51) Int. Cl.
*B61D 15/00* (2006.01)
*B61K 9/08* (2006.01)
*B60F 1/04* (2006.01)

(56) References Cited

U.S. PATENT DOCUMENTS

| | | | | |
|---|---|---|---|---|
| 2004/0018072 A1* | 1/2004 | Theurer | ................... | B61D 7/32 414/339 |
| 2004/0018073 A1* | 1/2004 | Theurer | ................... | B61D 7/32 414/339 |
| 2004/0255817 A1* | 12/2004 | Yang | ........................ | B60F 1/00 105/238.1 |
| 2007/0214892 A1* | 9/2007 | Turner | ................... | B61K 9/08 73/602 |
| 2011/0168050 A1* | 7/2011 | Sauron | ................... | E01B 31/18 104/15 |
| 2011/0233293 A1* | 9/2011 | Kral | ........................ | E01B 31/18 238/122 |
| 2011/0297752 A1* | 12/2011 | Keefe | ................... | B23K 9/046 238/122 |
| 2012/0192756 A1* | 8/2012 | Miller | ........................ | B61K 9/08 104/2 |
| 2012/0274772 A1* | 11/2012 | Fosburgh | .................. | B61K 9/08 348/149 |
| 2013/0191070 A1* | 7/2013 | Kainer | ................... | B61K 9/08 702/167 |
| 2014/0152814 A1* | 6/2014 | Farritor | ................... | B61K 9/08 348/142 |
| 2014/0156123 A1* | 6/2014 | Cooper | ................... | B61K 9/08 701/19 |
| 2015/0020707 A1* | 1/2015 | Zeng | ................... | E01B 31/18 104/2 |
| 2015/0055124 A1* | 2/2015 | Buhler | ................... | B61K 9/08 356/72 |

* cited by examiner

ONSITE STEEL RAIL LASER PROCESSING VEHICLE

CROSS-REFERENCE TO RELATED APPLICATIONS

The present application is a U.S. National Stage entry under 35 U.S.C. §371 of International Application No. PCT/CN2013/077200, filed on Jun. 13, 2013, designating the United States of America and published in Chinese on Jan. 9, 2014, which in turn claims priority to Chinese Application No. 201210229833.6, filed on Jul. 5, 2012, each of which is hereby incorporated by reference in its entirety.

FIELD OF THE INVENTION

The present invention relates to the technical field of surface strengthening and repairing for a rail, and more particularly to an on-line laser processing vehicle for a rail.

BACKGROUND OF THE INVENTION

Along with increase of train speed, traffic volume and axle loading, the rate of wear-out failure for a rail increases dramatically due to a dual effect of impact and wear caused by wheels. Conventional methods for improving life of rails throughout the world mainly focus on two aspects, namely heat treatment methods for rail and rail materials. With rapid development of laser technologies, methods of laser surface strengthening have been applied to rail for surface treating by domestic and foreign scholars, and good experimental results have been achieved.

The conventional method can only be accomplished in workshops; however, besides the laser surface strengthening method can facilitate fixed-point processing in workshops, the specific mobile equipment can be developed in order to take laser processing equipments into the railway field for on-line laser treating on rail.

A Chinese utility model 'Laser maintenance vehicle for rail' (Pub. No.: CN2622241Y, Pub. Date: Jun. 30, 2004) provides a laser maintenance vehicle for rail, the laser maintenance vehicle for rail includes two parts: a traction-control vehicle and a rail-operation vehicle. The traction-control vehicle is modified on the basis of a railway motor-trolley, the main difference therebetween is that a laser-operation console is disposed at the driver position of the railway motor-trolley; the rail-operation vehicle is modified on the basis of a railway passenger car which is equipped with one or two high-power $CO_2$ laser. A laser optical path and a numerical control system are set up to accurately transmit laser beam to the processing point on rail. To assure laser work on rail can be successfully accomplished, the laser maintenance vehicle for rail also includes a vehicle damping system, a laser damping system, a rust cleaning system for a rail surface, a spraying system for light-absorbing coatings on rail surface, a drying system for coatings, a gas supply system for laser, a powder supply system for laser, a cooling system for laser, a laser vehicle body, a monitoring and illuminating system, a body sealing and dust removing system, etc, other than a lasers system, a laser optical path and a mobile numerical control system.

According to the above description, the laser maintenance vehicle has several shortcomings as follows:

Firstly, the device uses the high-power $CO_2$ laser as a light source; the photoelectric conversion efficiency thereof is relatively low, while energy consumption thereof is high. The wavelength of the $CO_2$ laser is 10.6 microns, therefrom the absorption of a metal substrate to that is quiet low, and the procedure is comparatively complicated because the laser processing cannot be carried out until light-absorbing coatings are sprayed thereon and dried. Since a light-guide system of the $CO_2$ laser can only use a flying light path or a hard-light-path system for transmission, precision of the light-guide system may be inevitably affected by vibration generated by the laser maintenance vehicle during operation, and it is difficult to ensure long-term stability of laser processing.

Secondly, when the device carries out laser maintenance, the laser maintenance vehicle is stationary, and the maximum distance for a laser processing head moving along the rail is 1000 mm. The distance of a rail processed by the laser processing head at one time is limited by the length of the body of the laser maintenance vehicle due to the coming to a standstill of the laser maintenance vehicle, and thus making it inconvenient for long-distance repairing. Further, when the laser vehicle is to arrive to the next section of a rail to be repaired, since a movement distance of the traction-control vehicle cannot be accurate to centimeters, it is difficult for the traction-control vehicle to be precisely located.

Thirdly, compared with the concerned accurate trajectories required for laser processing, the overall accuracy of a railway line in a railway field is good, but an actual rail is a curve line erratically fluctuated along an overall route. A position of the laser processing head can not be adjusted in real time in the invention, thus it is difficult to ensure for the laser processing head to guarantee an accuracy of hardening a processing path.

In view of the drawbacks with the above-mentioned patent literature, in 2008, Chinese invention discloses an 'On-line laser processing device for strengthening treatment of rail surface' (Patent No.: 200810169671.5). The on-line laser processing device divides a laser processing system into two parts: a laser processing trolley and a power engineering vehicle. The laser processing trolley is small volume, light weight, good flexibility, and convenient loading and unloading, and is capable of effectively dodging trains, and facilitating various on-line strengthening treatment on rail; the power engineering vehicle includes devices with relatively large weight, such as a generator, a chiller, an air compressor, a cold dryer, a high-voltage power supply for a laser, a control system, and so on. By using a solid state laser as a light source capable of transmitting by fiber, the invention saves a complicated flying light path, and reduces loss of laser energy transmitted in an optical path; a laser used thereby emits a near-infrared laser with a wavelength of 1064 nmn, and absorption of the rail to the laser is high, therefore, procedures of pre-spraying coating and cleaning coating following thereby are not required, and thus simplifying the process, and reducing volume, weight, power consumption and cost of the device.

However, the above-mentioned on-line laser processing device still has the following shortcomings:

Firstly, the small laser processing trolley and the power engineering vehicle are two separated parts, the maximum distance of an interconnected fiber or a cable is 100 meters, which increases complexity of the device used in railway field; compared with a complete set of integrated equipment system, its reliability thereof is relatively low.

Secondly, although the small laser processing trolley is small volume, light weight and good flexibility, manpower or a small forklift is required to install it on a track, and connection and device adjustment of the fiber or the cable system need to be conducted on the track, therefore, effective time and processing efficiency of laser strengthening-toughening treatment on railway track are affected.

Thirdly, the way of approaching the railway track by the power engineering vehicle of the on-line laser processing device is sometimes limited. In some special places (such as mountain railways), the power engineering vehicle cannot conveniently approach railway tracks, and wheel systems thereof cannot directly travel thereon, which result in limitation of the combined type small laser processing trolley and power engineering vehicle on line laser processing device in terms of application range and efficiency.

In summary, how to further improve mobility of an on-line laser processing device and accuracy of a laser processing track for rail is a key to ensure application of the technology in railway transit. As for the on-line laser processing device, if it can both maintain accurate motion on a railway and quickly leave therefrom after laser processing, obviously more practical value is possible. In addition, the device should also possess basic features of an independent laser processing system, namely comprising a laser, a light guide system, a chiller, an air compressor, a cold dryer, a powder feeder, a movement actuators, a laser processing head, a control system, and so on, so that it can be applied to on-line laser strengthening-toughening treatment and laser cladding repairing for rail.

SUMMARY OF THE INVENTION

It is an objective of the present invention to provide an on-line laser processing vehicle for rail that is capable of precisely controlling running speed and distance of the laser processing vehicle upon processing of rails on line, accomplishing precise processing along a rail route, and facilitating laser processing for rail, such as the rail of main line, curved rail, guard rail, switch rail and so on, so that wear resistance of the rail is greatly improved after processing, and thus meeting requirements of high-speed and heavy haul trains for wear resistance of the rail.

The present invention provides an on-line laser processing vehicle for rail, including a chassis, a vehicle body disposed on the chassis, a steer-control chamber disposed in the front of the vehicle body, and a container disposed at the rear of the vehicle body, the container comprising a generator set, a control system, a movement actuator, and a laser processing head, the steer-control chamber comprises a console, a CCD monitoring system, and a drive-switching operating system, a dual driving and switching mechanism is disposed within the container of the laser processing vehicle.

The console is electrically connected to the generator set and the control system, and operates to switch on or off the generator set and the control system, the CCD monitoring system operates to monitor an aligning position and processing conditions of the laser processing head on rail surface, and the drive-switching operating system operates to conduct the dual driving and switching mechanism whereby facilitating switching between driving systems.

The control system operates to control the movement actuator to move in accordance with a preset trajectory, the laser processing head operates to move in accordance with the trajectory preset by the control system under the drive of the movement actuator, whereby conducting laser processing of rail surface.

The dual driving and switching mechanism comprises a process-operation driving system, a conventional operation driving system, and a switching mechanism.

The process-operation driving system operates to provide driving-power for the laser processing vehicle during laser processing procedure, to enable the laser processing vehicle to precisely control a movement speed and a distance thereof, and to meet requirement of various laser processing for movement of the laser processing vehicle, and the switching mechanism operates to implement switching between the conventional operation driving system and the process-operation driving system.

The on-line laser processing vehicle for rail of the present invention comprises the dual driving system and switching mechanism, the dual driving system is respectively a process-operation driving system and a conventional driving system, the conventional operation driving system provides power for the laser processing vehicle during normal operation without laser processing, and the process-operation driving system provides power for the laser processing vehicle during laser processing. Switching between the process-operation driving system and the conventional operation driving system is accomplished by means of the switching mechanism. When the laser processing vehicle conducts laser processing on a rail, the switching mechanism switches driving power to the process-operation driving system, and thus the moving speed and the distance of the laser processing vehicle can be controlled strictly and precisely, which meets various requirements for laser processing. As the laser processing vehicle finishes processing, the switching mechanism is to switch to the conventional operation driving system for quickly leaving, which saves time and avoids long-time occupation of tracks caused thereby.

The chassis of the on-line laser processing vehicle for rail of the present invention can be a chassis of a railway flat-deck car, a railway passenger car, or a respective-running-type convertible road-railway vehicle. As the chassis of the on-line laser processing vehicle for rail of the present invention is the chassis of the respective-running-type convertible road-railway vehicle, a climbing-rail system can be added to a vehicle body. By means of the climbing-rail system, the laser processing vehicle can climb on a rail on any railway track, and thus flexibility of climbing a rail for the laser processing vehicle is improved.

The movement actuator of the on-line laser processing vehicle for rail of the present invention can adopts a conventional numerical controlled machine tool and/or a multi-axis industrial robot and so on, and a photoelectric displacement sensor can be disposed thereon. As the laser processing vehicle snakes on the track, it is possible to adjust the laser processing head so that it is precisely aligned with a position to be processed on the rail, whereby ensuring accuracy of a processing trajectory of the laser processing vehicle.

The present invention provides three types of laser processing heads for the on-line laser processing vehicle for rail: a mechanical laser processing head, a multiple-light-outlet-type laser processing head, and a galvanometer-type laser processing head, structure of the first type is simple, processing efficiency of the second and the third type is high, and all the three heads can be selected according to different requirements.

BRIEF DESCRIPTION OF ACCOMPANYING DRAWINGS

FIG. 9 is a schematic view of another multiple-light-outlet-type laser processing head, in which

FIG. 13 is a schematic view illustrating structure and principle of the climbing-rail system 16, in which

In which: 1. Vehicle body; 2. chassis of railway flat-deck car or railway passenger car; 3. steer-control chamber; 4. container; 5. dual driving system and switching mechanism; 7. chiller; 8. laser group; 9. movement actuator; 10 light-guide system; 11. powder feeder; 12. air compressor; 13. cold dryer; 14. control system; 15. generator set; 16 and 16'. climbing-rail system; 17. laser processing head; 18. CCD monitoring device; 19. photoelectric displacement sensor; 20. chassis of respective-running-type convertible road-railway vehicle

SPECIFIC EMBODIMENTS OF THE INVENTION

For more clear understanding of the aim, technical solution and advantages of the present invention, the present invention will be illustrated in more detail with reference to the accompanying figures and embodiments as follows. It should be understood that the specific embodiments described herein are merely examples to explain the present invention and are not intended to limit the scope of the present invention.

The first embodiment is an on-line laser processing vehicle for rail according to the present invention.

Figure 1:
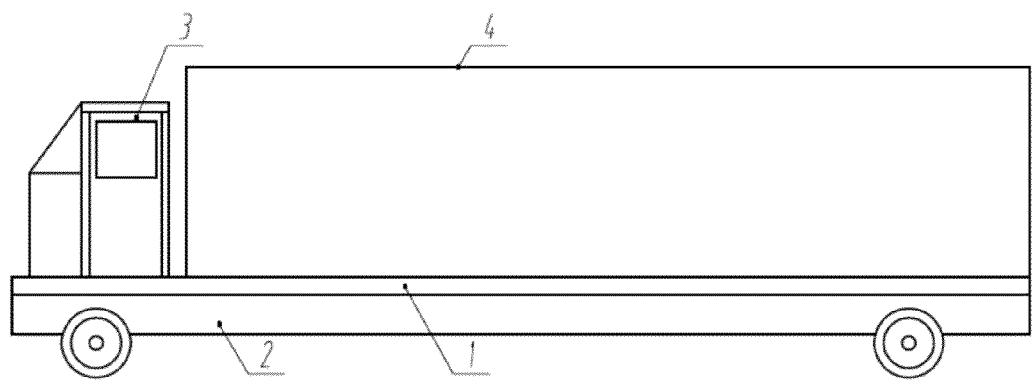
FIG. 1 is a schematic view of one embodiment of the present invention.
Figure 2:
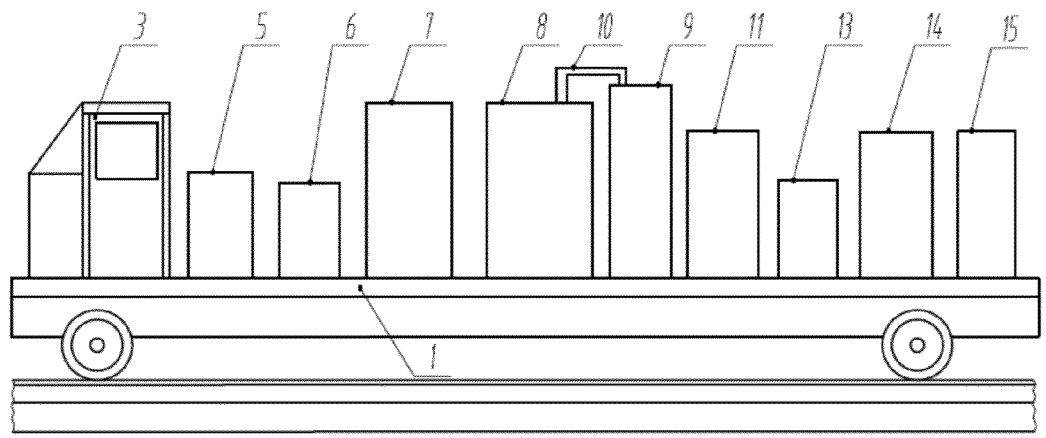
FIG. 2 is a front view of FIG. 1 without a container.
Figure 3:
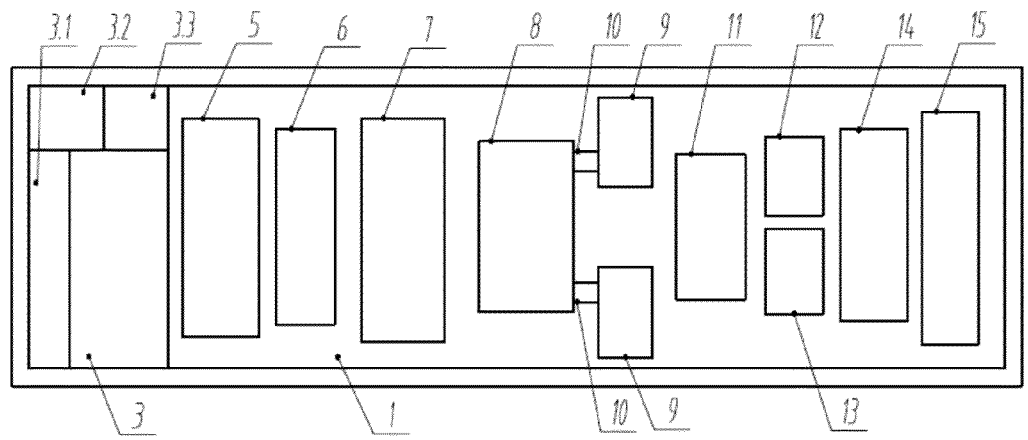
FIG. 3 is a top view of FIG. 2.

As shown in FIGS. 1 and 3, the laser processing vehicle comprises a vehicle body 1, a chassis 2, a steer-control chamber 3 disposed in front of the vehicle body 1, and a container 4 disposed at the rear of the vehicle body 1. The vehicle body 1 is disposed on the chassis 2, the chassis 2 is a chassis of a railway flat-deck car or a railway passenger car, and a transmission system for power transmission, a railway coupling-wheel system for running on the rail, and a turning and braking system are disposed at the bottom thereof. Besides a normal steering system, the steer-control chamber 3 comprises a console 3.1, a CCD monitoring system 3.2, and a drive-switching operating system 3.3. As shown in FIGS. 2 and 3, a dual driving and switching mechanism 5, a grinding and cleaning equipment 6, a chiller 7, a laser group 8, a movement actuator 9, a light-guide system 10, a powder feeder 11, an air compressor 12, a cold dryer 13, a control system 14, a generator set 15, a high-voltage power supply for a laser 16, and a laser processing head 17 are disposed within the container 4 of the laser processing vehicle.

The console 3.1 in the steer-control chamber 3 operates to switch on or off the generator set 15 and the control system 14; the CCD monitoring system 3.2 operates to monitor an aligning position and processing conditions of the laser processing head 17 on rail surface; the drive-switching operating system 3.3 operates to operate the dual driving and switching mechanism 5 so as to accomplish switching of a driving system; the grinding and cleaning equipment 6 operates to clean the rail surface to be processed; the genervator set 15 provides required electric energy for the chiller 7, the movement actuator 9, the powder feeder 11, the air compressor 12, the cold dryer 13, the control system 14 and the high-voltage power supply for a laser 16 during operation. The high-voltage power supply for a laser 16 provides the laser group 8 with high-voltage DC required for generating laser light. The laser group 8 can be a fiber laser, a diode-pumped solid-state laser, a lamp-pumped solid-state laser, a diode laser, or a disk laser; the movement actuator 9 is a conventional numerical controlled machine tool and/or a multi-axis industrial robot.

The control system 14 is electrically connected to the chiller 7, the laser group 8, the powder feeder 11, the air compressor 12, the cold dryer 13 and the high-voltage power supply for a laser 16, whereby controlling on or off thereof, and the movement actuator 9 to move according to a preset trajectory. Under the drive of the movement actuator 9, the laser processing head 17 moves according to the trajectory preset by the control system 14, whereby facilitating laser processing of the rail surface. The laser group 8 transmits laser beams to the laser processing head 17 via the light-guide system 10, and the beams are focused and applied to surface of work pieces. The light-guide system 10 can adopts an existing fiber transmission system. As a semiconductor laser is used as a light source, the laser group 8 can be connected to the laser processing head 17 via the light-guide system 10 (which is an expanding and collimating system herein). The power feeder 11 is connected to a nozzle of the laser processing head 17 via a pipe.

The chiller 7 supplies cooling water for the laser group 8, the light-guide system 10 and optical mirrors on the laser processing head 17 via pipelines. An air outlet of the air compressor 12 is connected to an air inlet of the cold dryer 13 via a pipeline, and an air outlet of the cold dryer 13 is connected to a nozzle of the laser processing head 17 via a pipeline. Compressed air generated by the air compressor 12 is transferred to the laser processing head 17 as protection gas via a pipeline to prevent dust and smog produced during laser surface processing from contaminating the focusing mirror of the laser processing head 17 after being filtered by the cold dryer 13 whereby eliminating liquid substance such as water, oil drops and so on. The other outlet of the cold dryer 13 is connected to the powder feeder 11 via a pipeline, as the powder feeder 11 is switched on, the gas transfers alloy powders to the laser processing head 17 via a pipeline, and is blown out from the nozzle.

Figure 4:
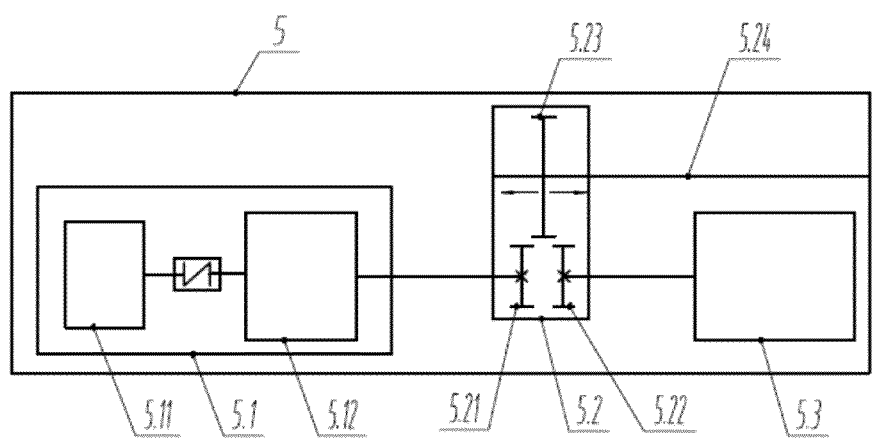
FIG. 4 is a diagram illustrating a dual driving system and switching mechanism.

As shown in FIG. 4, the dual driving and switching mechanism 5 comprises a process-operation driving system 5.1, a conventional operation driving system 5.3, and a switching mechanism 5.2. The process-operation driving system 5.1 comprises a servo drive motor 5.11 and a speed reducer 5.12, and the motor 5.11 is connected to the speed reducer 5.12 via an elastic coupling.

The control system 14 is respectively electrically connected to the process-operation driving system 5.1 and the conventional operation driving system 5.3, both of which can drive the laser processing vehicle to operate according to settings of the control system 14. The process-operation driving system operates to provide driving power for the laser processing vehicle during laser processing, enables the laser processing vehicle to precisely control moving speed and distance of the laser processing vehicle whereby meeting requirements of various laser processing for the laser processing vehicle; the conventional operation driving system 5.3 provides driving power for the laser processing vehicle as the laser processing vehicle does not conduct laser processing.

The switching mechanism 5.2 can be facilitated in a variety of ways, such as electric control of a clutch, or mechanical structure of gear switching. The switching mechanism 5.2 in FIG. 4 is merely one mechanical structure. The switching mechanism 5.2 comprises a first small gear 5.21, a second small gear 5.22, a large gear 5.23 and an output shaft 5.24, the first small gear 5.21 is fixedly disposed on an end of an output shaft of the speed reducer 5.12, the second small gear 5.22 is fixedly disposed on an end of an output shaft of the conventional operation driving system 5.3, the large gear 5.23 is movably disposed on the output shaft 5.24, and capable of sliding thereon, and the output shaft 5.24 is connected to a railway coupling-wheel system via a transmission system of the chassis 2.

The switching mechanism 5.2 can facilitate switching between the conventional operation driving system 5.3 and the process-operation driving system 5.1. As the laser processing vehicle requires to process a rail, the control system 14 controls the large gear 5.23 to slide to one side on the output shaft 5.24 and be engaged with the first small gear 5.21, and the switching mechanism 5.2 is switches to the process-operation driving system 5.1. Then the moving speed and distance of the laser processing vehicle can be precisely controlled by the settings of the control system 14, whereby meeting requirements of various laser processing for movement of the laser processing vehicle. After the laser processing is completed, the control system 14 controls the large gear 5.23 to slide to the other side on the output shaft 5.24 and be engaged with the second small gear 5.22, the switching mechanism 5.2 switches to the conventional operation driving system 5.3, which enables the vehicle to leave quickly, and thus saving time and avoiding long-time occupation of the track.

Figure 5:
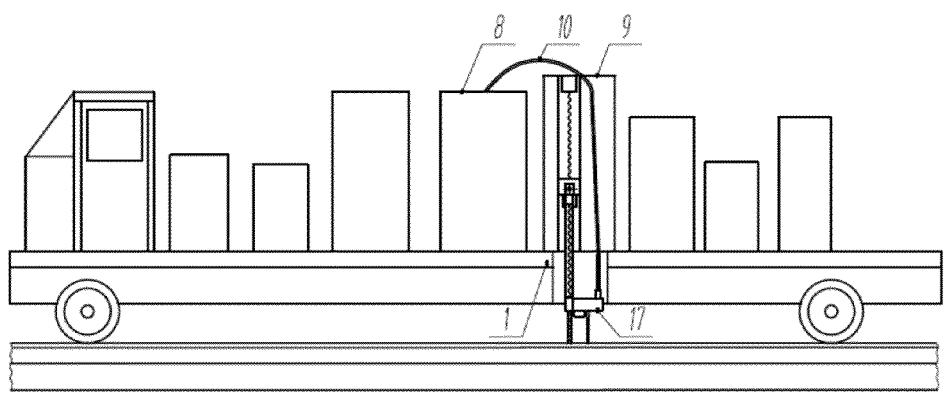
FIG. 5 is a schematic view of laser processing on a rail surface by a laser processing head upon a movement actuator.
Figure 6:
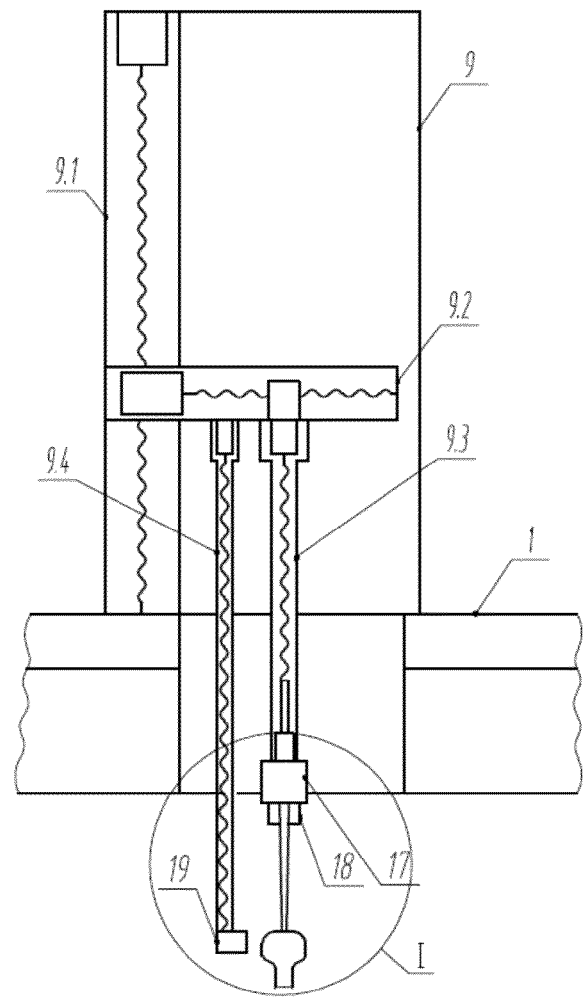
FIG. 6 is a side view of a movement actuator and a laser processing head in FIG. 5.

As shown in FIG. 5, the movement actuator and the laser processing head 17 of the laser processing vehicle conduct the laser processing on the rail. As shown in FIG. 6, the movement actuator 9 is one common-used numerical controlled machine tool, and comprises an upright column 9.1, a crossbeam 9.2, a right longitudinal stringer 9.3 and a left longitudinal stringer 9.4. A pair of ball screws and nuts is disposed in the upright column 9.1, the crossbeam 9.2, the right longitudinal stringer 9.3 and the left longitudinal stringers 9.4, the ball screw is driven by the servo motor. The crossbeam 9.2 is capable of moving up and down on the upright column 9.1, the right longitudinal stringer 9.3 is capable of moving on the crossbeam 9.2, and the left longitudinal stringer 9.4 is fixedly disposed on the crossbeam 9.2. The laser processing head 17 is disposed on the right longitudinal stringer 9.3, and capable of moving up and down thereon, the CCD monitoring device 18 is disposed at the bottom of the laser processing head 17; the photoelectric displacement sensor 19 is disposed on the left longitudinal stringer 9.4 and capable of moving up and down thereon. The CCD monitoring device 18 is communicatively connected to the CCD monitoring system 3.2; the CCD monitoring device 18 transfers monitored pictures to the CCD monitoring system 3.2. The photoelectric displacement sensor 19 is electrically connected to the control system 14; the control system 14 receives data collected by the photoelectric displacement sensor 19 and issues the instruction to the movement actuator 9 for operation.

As the laser processing vehicle is to conduct laser processing, firstly, the drive-switching operating system 3.3 controls the dual driving and switching mechanism 5 to switch to the conventional operation driving system 5.3, and the laser processing vehicle travels to a rail section to be processed under the drive of the driving system, then the drive-switching operating system 3.3 controls the dual driving and switching mechanism 5 to switch to the process-operation driving system 5.1. Next, the console 3.1 starts switches of the generator set 15 and the control system 14, then the control system 14 controls and starts switches of the chiller 7, the laser group 8, the movement actuator 9, the powder feeder 11, the air compressor 12, the cold dryer 13, and the high-voltage power supply for a laser 16, and enable all these devices to be in a standby state. As shown in FIG. 6, the control system 14 controls the crossbeam 9.2 of the movement actuator 9 to move down to a right place along the upright column 9.1; the right longitudinal stringer 9.3 moves down along with the cross beam 9.2, and forces the laser processing head 17 to move down until above a position of the rail to be processed along the right longitudinal stringer 9.3, until above a position to be processed on said rail along said right longitudinal stringer (9.3), the photoelectric displacement sensor 19 moves down to a position with a certain distance from an inner side of the rail and parallel thereto along the left longitudinal stringer 9.4. At the time, the laser processing head 17 and the photoelectric displacement sensor 19 have already accomplished the work of aligning and adjusting, then the control system 14 issues an instruction enabling the laser group 7 to emit laser beam according to preset parameters, meanwhile the laser processing vehicle travels forward on the rail under the drive of the process-operation driving system 5.1 according to the preset parameters. During laser processing, due to serpentine characteristics of the railway track, the laser processing vehicle also snakes; the photoelectric displacement sensor 19 measures the displacement variation between itself and an inner side of the rail, and feeds back the displacement variation to the control system 14, an initial distance therebetween being a zero point, the control system 14 controls the right longitudinal stringer 9.3 to move on the crossbeam 9.2 according to the displacement variation, whereby ensuring the laser processing head 17 is always accurately aligned with the position to be processed on the rail, and facilitating an accurate trajectory of the laser processing vehicle during laser processing.

Figure 7:
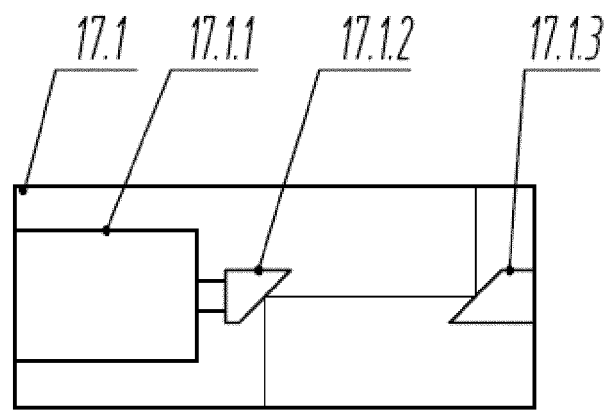
FIG. 7 is a schematic view of a mechanical laser processing head.
Figure 8:
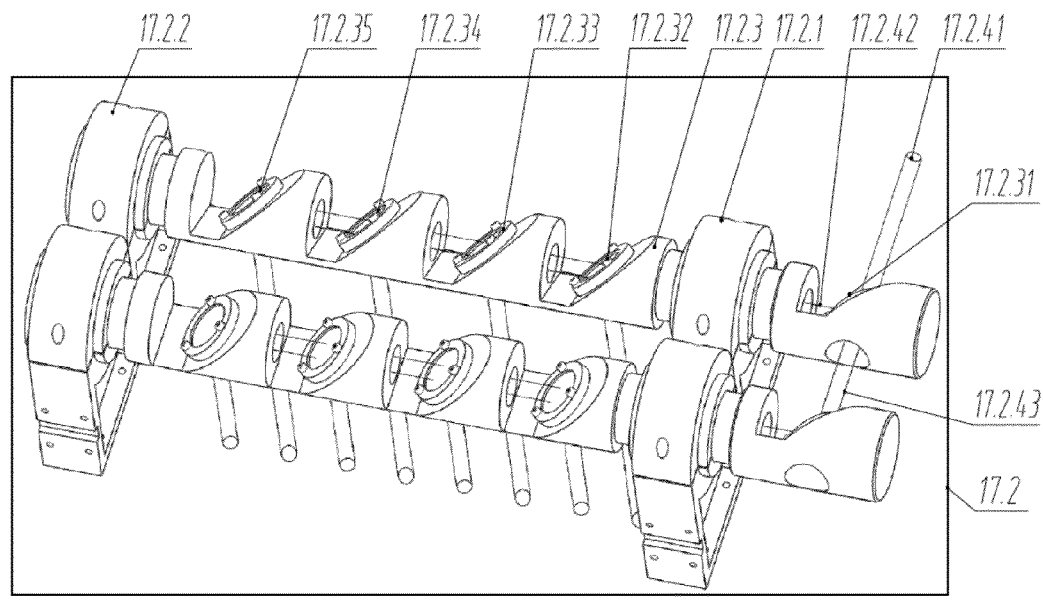
FIG. 8 is a schematic view of a multiple-light-outlet-type laser processing head.
Figure 9A:
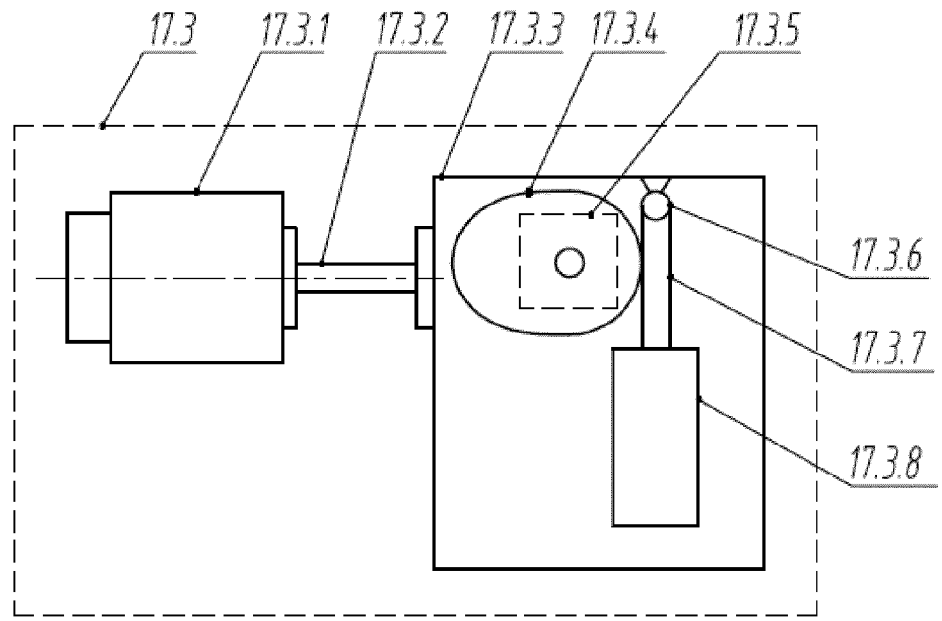
FIG. 9(a) is a front view.
Figure 9B:
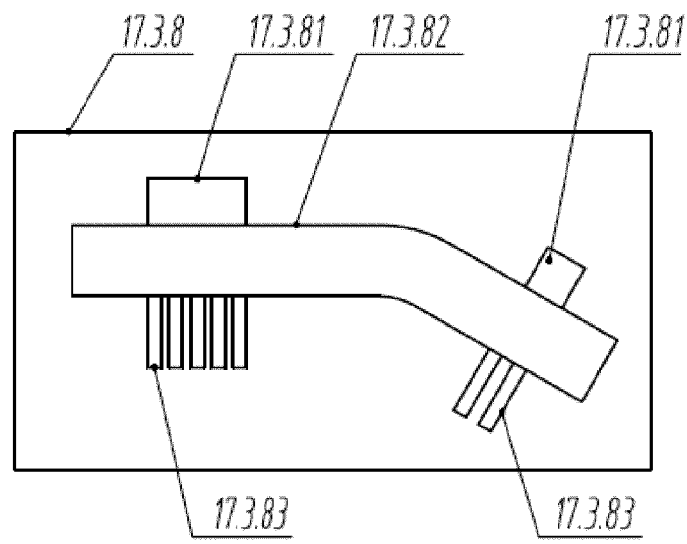
FIG. 9(b) is a schematic view of a head frame in FIG. 9(a)
Figure 10:
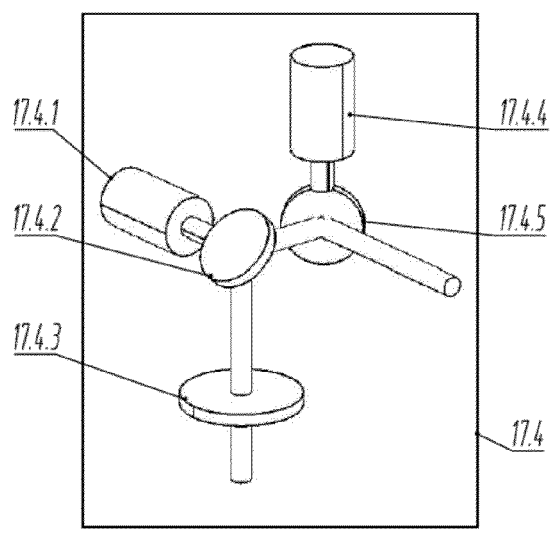
FIG. 10 is a schematic view of a galvanometer-type laser processing head.

The laser processing head 17 comprises a mechanical laser processing head 17.1 as shown in FIG. 7, a multiple-light-outlet-type laser processing heads 17.2 and 17.3 as shown in FIGS. 8 and 9, and a galvanometer-type laser processing head 17.4 as shown in FIG. 10.

As shown as FIG. 7, the mechanical laser processing head 17.1 comprises a servo motor 17.1.1, a reflective mirror 17.1.2 and reflective mirror 17.1.3, the reflective mirror 17.1.3 is fixedly disposed on a frame of the mechanical laser processing head 17.1, the reflective mirror 17.1.2 is disposed on an output shaft of the servo motor 17.1.1, and the servo motor 17.1.1 is capable of driving the reflective mirror 17.1.2 to swing. The mechanical laser processing head 17.1 is capable of facilitating scanning laser processing of the rail with a single beam.

As shown in FIG. 8, the first multiple-light-outlet-type laser processing head 17.2 comprises a first holder 17.2.1 and a second holder 17.2.2, a hollow shaft 17.2.3 capable of swinging is disposed therebetween; a first beam splitting mirror 17.2.31, a second beam splitting mirror 17.2.32, a third beam splitting mirror 17.2.33, a fourth beam splitting mirror 17.2.34 and a reflective mirror 17.2.35 are fixedly disposed within the hollow shaft 17.2.3. Each of the beam splitting mirrors and the reflective mirror can reflect at 45 degrees, a ratio of reflection to transmission of each of the first beam splitting mirror 17.2.31 and the fourth beam splitting mirror 17.2.34 is 1:1, a ratio of reflection to transmission of the second beam splitting mirror 17.2.32 is 1:3, a ratio of reflection to transmission of the third beam splitting mirror 17.2.33 is 1:2.

A laser beam (17.2.41) is divided into a reflected beam 17.2.42 and a transmitted beam 17.2.43 by the first beam splitting mirror 17.2.31, the reflected beam 17.2.42 successively passes through the second beam splitting mirror 17.2.32, the third beam splitting mirror 17.2.33, the fourth beam splitting mirror 17.2.34 and the reflective mirror 17.2.35, and finally four laser beams with equal energy are obtained and applied on the rail, a transmitted beam 17.2.43 can be divided into four laser beams with equal energy and applied on the rail in the same way, each of the beam splitting mirror can swing along with the hollow shaft 17.2.3 whereby facilitating simultaneous scanning laser processing of the rail with multiple beams.

As shown in FIG. 9(*a*), the second multiple-light-outlet-type laser processing head 17.3 comprises a first motor 17.3.1, an first motor shaft 17.3.2, a frame 17.3.3, a cam 17.3.4, a second motor 17.3.5, a hinge 17.3.6, a strut 17.3.7 and a processing head frame 17.3.8; the cam 17.3.4, the second motor 17.3.5, the hinge 17.3.6, the strut 17.3.7 and the processing head frame 17.3.8 are disposed on the frame 17.3.3, the processing head frame 17.3.8 is disposed at one end of the strut 17.3.7; the first motor 17.3.1 drives the cam 17.3.4 in the frame 17.3.3 via the first motor shaft 17.3.2; the second motor 17.3.5, the hinge 17.3.6, the strut 17.3.7, and the processing head frame 17.3.8 swing with respect to the first motor shaft 17.3.2; the second motor 17.3.5 drives the cam 17.3.4 to rotate around an output shaft of the second motor 17.3.5 whereby forcing the strut 17.3.7 and the processing head frame 17.3.8 to swing with respect to the hinge 17.3.6; the processing head frame 17.3.8 comprises two groups of collimating and focusing mirror system 17.3.81, a light outlet group 17.3.83, and a supporting frame 17.3.82 for supporting and installing the two parts, the light outlet group 17.3.83 may comprise one or more light outlets whereby facilitating simultaneous laser processing with multiple beams.

As shown in FIG. 10, the galvanometer-type laser processing head 17.4 employs a typical dual vibrating-mirror structure comprising a first dedicated motor 17.4.1, a first vibrating-mirror 17.4.2, a field mirror 17.4.3, a second dedicated motor 17.4.4, and a second vibrating-mirror 17.4.5. The first vibrating-mirror 17.4.2 and the second vibrating-mirror 17.4.5 are respectively disposed on an output shaft of the first dedicated motor 17.4.1 and the second dedicated motor 17.4.4, and capable of swinging with respect to the output shaft of the first dedicated motor 17.4.1 and second dedicated motor 17.4.4 respectively, whereby adjusting positions of the laser beam in two different directions. Finally the laser beam is applied to a work piece via the field mirror 17.4.3. Thus quick scanning laser processing can be facilitated under the control of programs.

Figure 14:
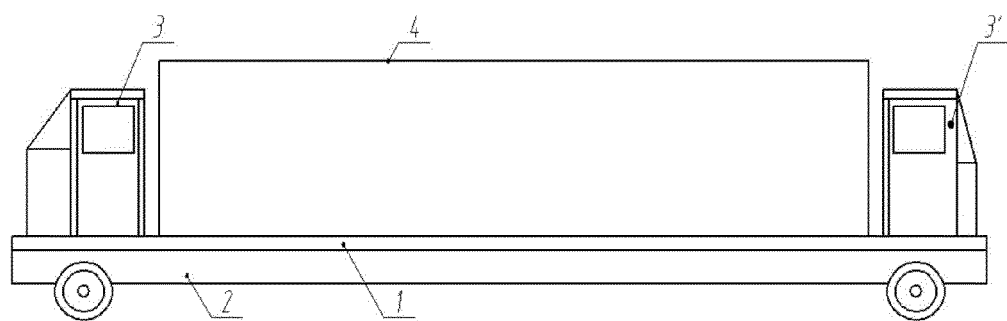
FIG. 14 is a schematic view of an additional passenger cab based on FIG. 1.

As shown in FIG. 14, an additional passenger cab 3' is disposed at the rear of the vehicle body. The additional passenger cab 3' enables an assistant driver to observe rail conditions behind the vehicle as the vehicle travels on the rail, and a simple control button is disposed in the additional passenger cab 3' and functions for safety, such as braking or parking, in case of emergency.

The dual driving and switching mechanism 5 of the first embodiment of the invention is capable of switching between driving systems according to different working conditions of the laser processing vehicle, and ensuring accuracy of the laser processing by precise operation thereof on the rail according to process requirements during laser processing.

A photoelectric displacement sensor 19 is disposed on the movement actuator 9 of the first embodiment of the invention, the photoelectric displacement sensor 19 is capable of adjusting positions of the laser processing head 17 in real time according to a rail trajectory, ensuring the laser processing head 17 is always precisely aligned with a position of the rail to be processed, and guaranteeing precise trajectories of the laser processing.

The laser processing head 17 of the first embodiment of the invention comprises mechanical laser processing head 17.1, multiple-light-outlet-type laser processing heads 17.2 and 17.3, and galvanometer-type laser processing head 17.4. The CCD monitoring device 18 is disposed at the bottom of the laser processing head 17. The multiple-light-outlet-type laser processing heads 17.2 and 17.3 can facilitate simultaneous laser processing of multiple light spots, and the galvanometer-type laser processing head 17.4 can facilitate programmatic laser scanning. The first method is simple, the second and the third method feature high processing efficiency, and these three methods can be chosen according to different requirements.

The second embodiment is a convertible road-railway laser processing vehicle according to the present invention.

Figure 11:
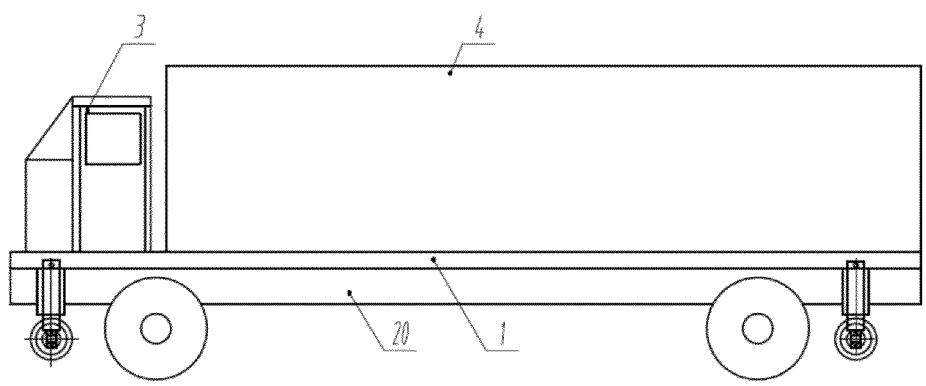
FIG. 11 is a schematic view of a chassis of a laser processing vehicle being a respective-running-type convertible road-railway vehicle.

As shown in FIG. 11, difference of the second embodiment from the first embodiment is the chassis of the used laser processing vehicle, the second embodiment uses a chassis of a respective-running-type convertible road-railway vehicle 20, so that the laser processing vehicle is capable of traveling on a railway or a road. As the chassis of the respective-running-type convertible road-railway vehicle 20 is used, the conventional operation driving system 5.3 of the dual driving and switching mechanism 5 is a driving system of a convertible road-railway vehicle; the steer-control chamber 3 is changed correspondingly: the conventional operation driving system therein is changed to a conventional operation driving system for the convertible road-railway vehicle; in addition, the console 3.1, the CCD monitoring system 3.2 and the drive-switching operating system 3.3 are disposed therein. The drive-switching operating system 3.3 operates to control the dual driving and switching mechanism 5 to switch between the process-operation driving system 5.1 and the driving system of the convertible road-railway vehicle. A road-railway mode conversion system is disposed in the driving system of the convertible road-railway vehicle, and capable of facilitating switching of "road to railway" and "railway to road" for the convertible road-railway laser processing vehicle.

Other parts of the convertible road-railway laser processing vehicle of the second embodiment are the same as those of the first embodiment.

The third embodiment is another form of the convertible road-railway laser processing vehicle according to the present invention.

Figure 12:
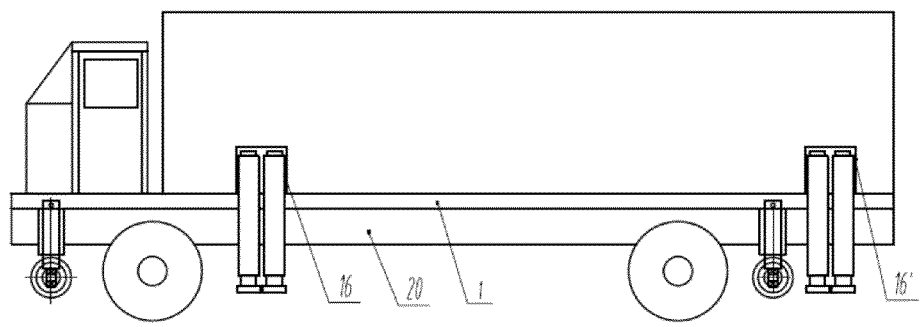
FIG. 12 is a schematic view of a chassis in FIG. 11 with additional climbing-rail systems 16 and 16'.

As shown in FIG. 12, difference of the third embodiment from the second embodiment is that climbing-rail systems 16 and 16' are added to the chassis of the respective-running-type convertible road-railway vehicle 20. Since the climbing-rail systems 16 and 16' use hydraulic cylinders, a hydraulic system is disposed in the container 4, meanwhile, an operation platform operating to control the climbing-rail systems 16 and 16' and the hydraulic system is disposed in the steer-control chamber 3. Other parts of the convertible road-railway laser processing vehicle are the same as those of the first embodiment.

Figure 13A:
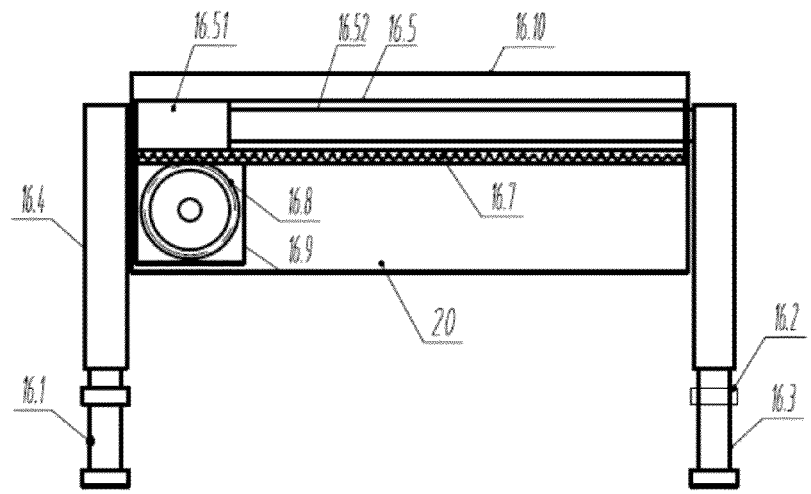
FIG. 13(a) is a front view.
Figure 13A:
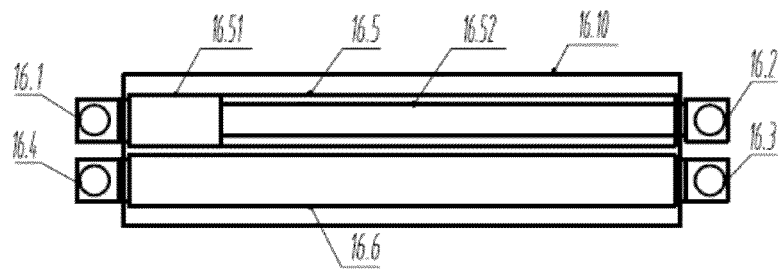

As shown in FIG. 13a, the climbing-rail system 16 comprises four lifting devices and a transverse expanding device 16.5, the four lifting device are a first lifting device 16.1, a second lifting device 16.2, a third lifting device 16.3 and a fourth lifting device 16.4 respectively; the transverse expanding device 16.5 comprises a hydraulic cylinder 16.51 and a piston rod 16.52, one end of the piston rod 16.52 is fixedly connected to the hydraulic cylinder 16.51, the other end thereof is fixedly connected to the second lifting device 16.2, the other end of the transverse expanding device 16.5 is fixedly connected to the first lifting device 16.1, a gear rack 16.7 is disposed at the bottom thereof, the third lifting device 16.3 and the fourth lifting device 16.4 are connected via a connecting rod 16.6, the connecting rod 16.6 is fixedly disposed within a square frame 16.10, the square frame 16.10 is fixedly disposed on the chassis of a respective-running-type convertible road-railway vehicle 20, a hydraulic motor 16.9 and a gear 16.8 are disposed in the chassis of a respective-running-type convertible road-railway vehicle 20, the hydraulic motor 16.9 is axially connected to sad shaft of gear 16.8; the transverse expanding device 16.5 is disposed in the square frame 16.10 via engagement between the gear rack 16.7 and the gear 16.8 disposed at the bottom thereof.

Figure 13B:
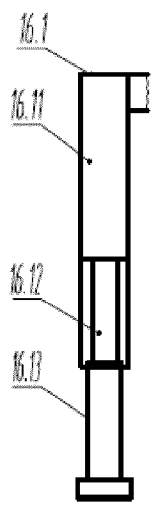
FIG. 13(b) is a schematic view of a first lifting device in FIG. 13(a), and FIG. 13(c), FIG. 13(d) and FIG. 13(e) illustrate principle of the climbing-rail system 16.

As shown as FIG. 13(b), the first lifting device 16.1 comprises a hydraulic cylinder 16.11, a piston rod 16.12 and a lifting sleeve 16.13, wherein one end of the piston rod 16.12 is connected to the hydraulic cylinder 16.11, the other end thereof is connected to the lifting sleeve 16.13. Structure of the second lifting device 16.2, the third lifting device 16.3 and the fourth lifting device 16.4 is the same as that of the first lifting device 16.1. Structure of the climbing-rail system 16' is the same as the climbing-rail system 16. The climbing-rail systems 16 and 16' enables the laser processing vehicle to safely climb almost on any rail.

The hydraulic system in the container 4 provides hydraulic power for each hydraulic cylinder and each hydraulic motor of the climbing-rail systems 16 and 16', the operation platform operates to switch on or off the hydraulic system, and to control power provided by the hydraulic system.

Figure 13C:
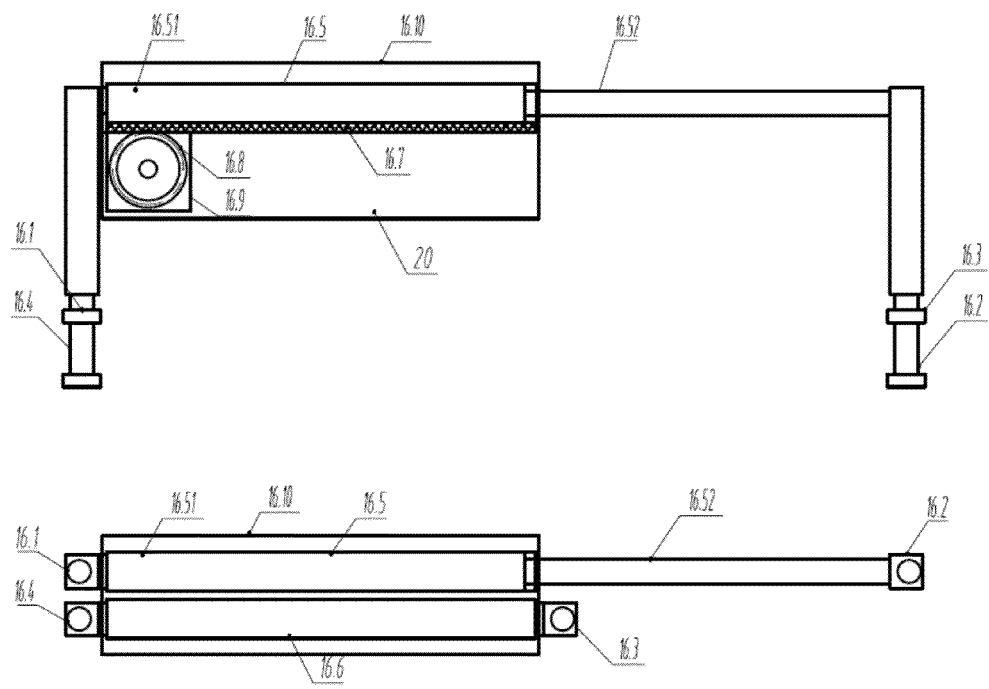
Figure 13D:
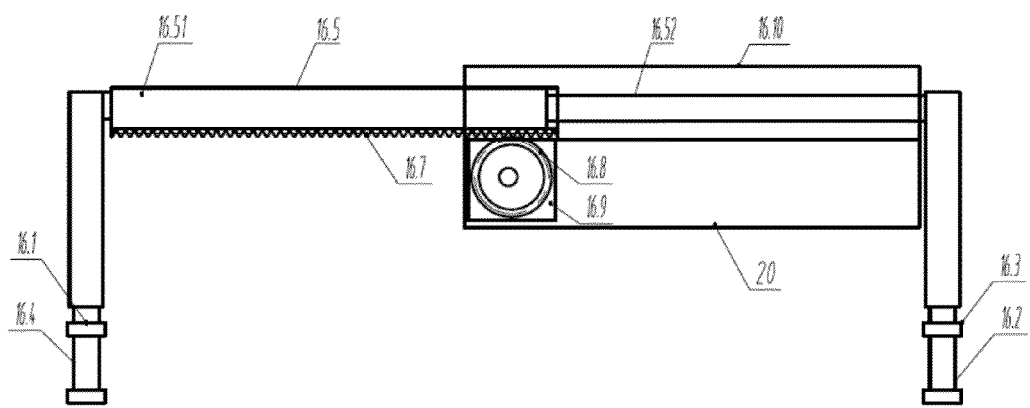
Figure 13D:
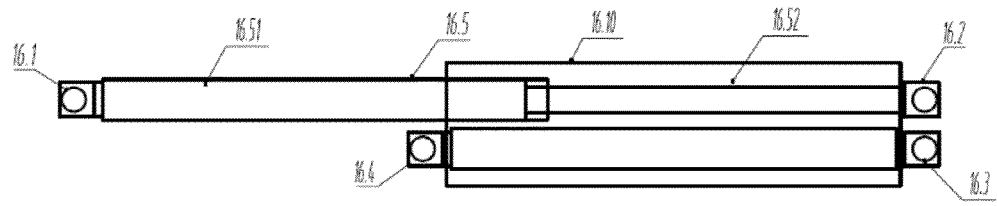
Figure 13E:
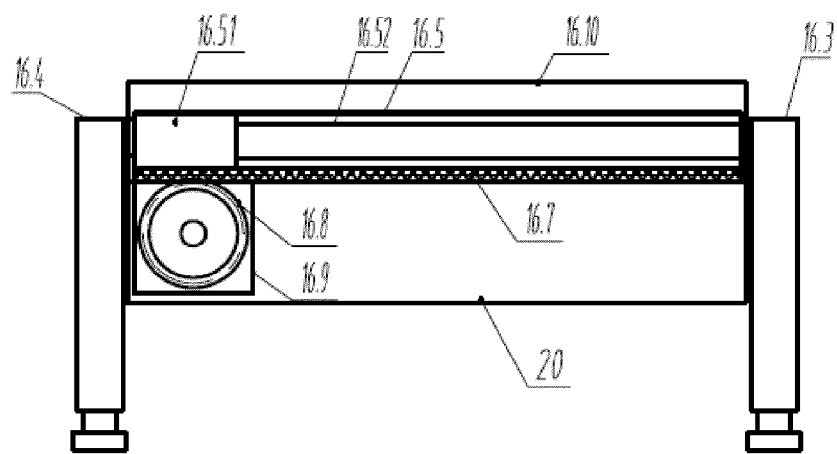
Figure 13E:
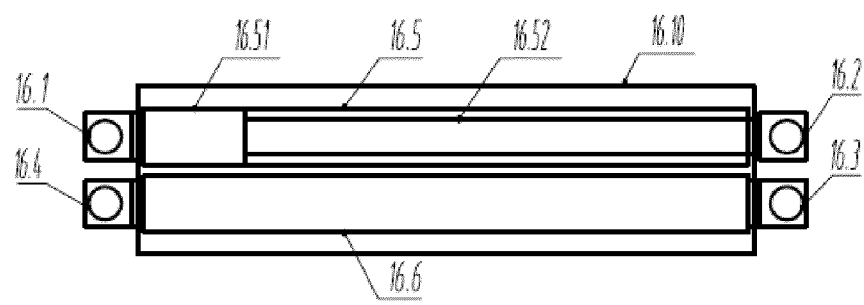

Specifically, rail climbing of the convertible road-railway laser processing vehicle is facilitated according to the following steps: firstly, as shown in FIG. 13(a), the hydraulic system controls the hydraulic cylinders in the first lifting device 16.1 and third lifting device 16.3 of the climbing-rail system 16 to push the lifting sleeve to extend downwards via the piston rod whereby supporting the square frame 16.10 on the chassis of respective-running-type convertible road-railway vehicle 20, the first lifting device 16.1' and the third lifting device 16.3' of the climbing-rail system 16' also support the square frame 16.10', and the square frames 16.10 and 16.10' support weight of the whole laser processing vehicle, and lifts the vehicle body above the railway track; secondly, as shown in FIG. 13(c), under the drive of the hydraulic cylinder 16.51 of the transverse expanding device 16.5 via the piston rod 15.52, the second lifting device 16.2 extends to a certain length, then the second lift device 16.2 extends downward, and the third lifting device 16.3 shrinks upwards to an initial position, at the time, the first lifting device 16.1 and the second lifting device 16.2 supports the square frame 16.10, climbing-rail system 16' has done the same process, and thus the laser processing vehicle is supported; thirdly, as shown in FIG. 13(d), the chassis of respective-running-type convertible road-railway vehicle 20 drives the gear 16.8 to horizontally move to the right on the gear rack 16.7 via the hydraulic motor 16.19 therein, and thus forcing the vehicle body to horizontally move to the right on the transverse expanding device 16.5 until above the rail; fourthly, as shown in FIG. 13(e), as the chassis of the respective-running-type convertible road-railway vehicle 20 slowly lays down the railway coupling-wheel system on the rail whereby supporting the whole vehicle body, the first lifting device 16.1 and the second lifting device 16.2 shrink to their original positions, meanwhile the transverse expanding device 16.5 also shrinks to its original position, thus rail climbing of the convertible road-railway laser processing vehicle is completed.

The third embodiment can almost climb on rails at any railway track, and greatly improves flexibility of the convertible road-railway laser processing vehicle in comparison with the second embodiment.

The fourth embodiment is a further form of the convertible road-railway laser processing vehicle according to the present invention.

Figure 15:
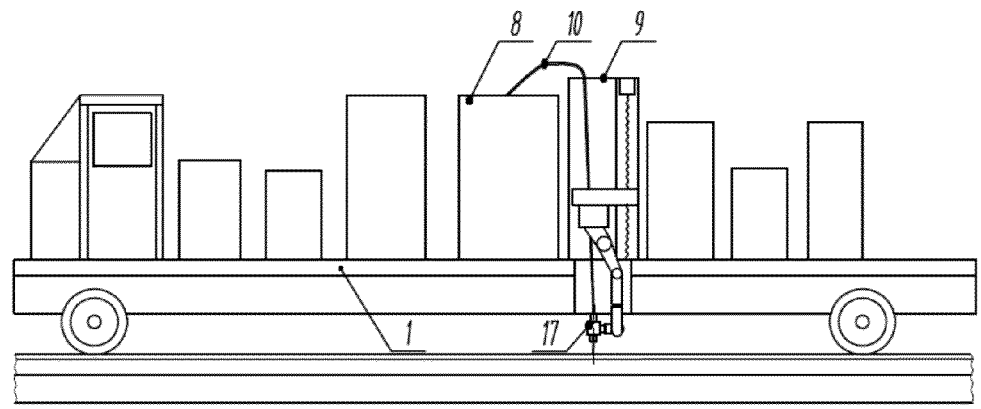
FIG. 15 is a schematic view of a laser processing vehicle with a movement actuator combining a numerical controlled machine tool and an industrial robot.
Figure 16:
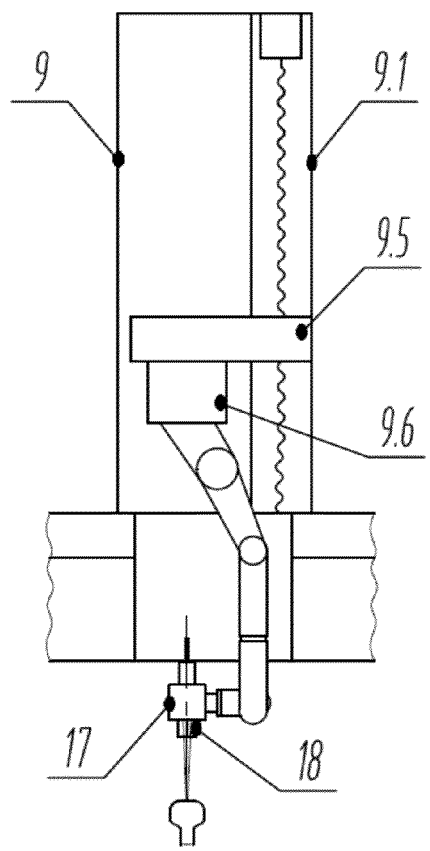
FIG. 16 is a schematic view illustrating principle of the movement actuator in FIG. 15.

As shown in FIG. 15, difference of the fourth embodiment from the first embodiment is that instead of using the conventional numerical controlled machine tool, the movement actuator 9 for laser processing is a combination of the numerical controlled machine tool and an industrial robot. As shown in FIG. 16, the movement actuator 9 comprises an upright column 9.1, a slide carriage 9.5 and an industrial robot 9.6. A pair of ball screws and nuts is disposed in the upright column 9.1, and the ball screw is driven by a servo motor. The industrial robot 9.6 is disposed on the slide carriage 9.5, and capable of moving up and down on the upright column 9.1 along with the slide carriage 9.5; a laser processing head 17 is disposed on one end of the industrial robot 9.6, and a CCD monitoring device 18 is disposed at the bottom of the laser processing head 17.

A control function of the industrial robot is added to the control system 14; firstly, the control system 14 controls the slide carriage 9.5 of the movement actuator 9 and the industrial robot 9.6 to move downwards along the upright column 9.1 to an appropriate position, and then shafts of the industrial robot 9.6 move harmoniously, whereby adjusting the laser processing head 17 to an appropriate processing position and facilitating laser processing of rail surface.

Other parts of the convertible road-railway laser processing vehicle of the fourth embodiment are the same as those of the first embodiment.

It will readily be understood to those skilled in the art that the foregoing is only the preferred embodiments of the present invention, but not intended to limit the present invention. Any modification, equivalent replacement, improvement and so on made within the spirit and principle of the invention should be included in the scope of the invention.

What is claimed is:
1. An on-site laser processing vehicle for a rail, the laser processing vehicle comprising:
   a chassis (2);
   a vehicle body (1) disposed on said chassis (2);
   a container (4) disposed above said vehicle body (1);
   a dual driving and switching mechanism (5) disposed in or otherwise in communication with said container (4), having a process-operation driving system (5.1) configured to provide driving-power and precise control of movement, speed, and distance for said laser processing vehicle, a conventional operation driving system (5.3), and a switching mechanism (5.2) configured to imple- ment switching between said conventional operation driving system (5.3) and said process-operation driving system (5.1);
a generator set (15) disposed in or otherwise in communication with said container (4);
a movement actuator (9) disposed in or otherwise in communication with said container (4);
a control system (14) disposed in or otherwise in communication with said container (4) and configured to control said movement actuator (9) to move in accordance with a preset trajectory;
a laser processing head (17) disposed in or otherwise in communication with said container (4) and configured to move in accordance with said preset trajectory via said movement actuator (9), thereby conducting laser processing of the rail surface;
a steering-control chamber (3) disposed above said vehicle body (1) in front of said container (4);
a console (3.1) disposed in or otherwise in communication with said steering-control chamber (3) and electrically connected to and configured to switch on or off said generator set (15) and said control system (14);
a CCD monitoring system (3.2) disposed in or otherwise in communication with said steering-control chamber (3) and configured to monitor an alignment position and processing conditions of said laser processing head (17) on a surface of the rail; and
a drive-switching operating system (3.3) disposed in or otherwise in communication with said steering-control chamber (3) and configured to conduct said dual driving and switching mechanism (5), thereby facilitating switching between driving systems.

2. The on-site laser processing vehicle for a rail of claim 1, wherein:
the chassis (2) comprises a chassis of a respective-running-type convertible road-railway vehicle (20);
the conventional operation driving system (5.3) comprises a driving system for said respective-running-type convertible road-railway vehicle;
said steering-control chamber (3) comprises a steering operating system for said respective-running-type convertible road-railway vehicle;
a road-railway mode conversion system is disposed in or otherwise in communication with the conventional operation driving system of said respective-running-type convertible road-railway vehicle and facilitates operation mode conversion from a road to a rail and from a rail to a road for said respective-running-type convertible road-railway vehicle.

3. The on-site laser processing vehicle for a rail of claim 2, wherein an additional passenger cab (3') is disposed at or otherwise in communication with the rear of said vehicle body for observation and control of said vehicle on said rail during operation.

4. The on-site laser processing vehicle for a rail of claim 1, further comprising:
a first climbing-rail system (16) and a second climbing-rail system (16') disposed on or otherwise in communication with said chassis of a respective-running-type convertible road-railway vehicle (20) and configured to enable said laser processing vehicle to climb on rails at a railway track, wherein said climbing-rail systems (16,16') have the same structure, with said first climbing-rail system (16) comprising:
a frame (16.10) fixedly disposed on or otherwise in communication with said chassis of a respective-running-type convertible road-railway vehicle (20);
a gear (16.8) disposed on or otherwise in communication with said chassis of a respective-running-type convertible road-railway vehicle (20);
a gear rack (16.7) disposed above or otherwise in communication with said gear (16.8);
a hydraulic motor (16.9) disposed on or otherwise in communication with said chassis of a respective-running-type convertible road-railway vehicle (20) and axially connected to a shaft of said gear (16.8);
four lifting devices, comprising a first lifting device (16.1), a second lifting device (16.2), a third lifting device (16.3), and a fourth lifting device (16.4), wherein said four lifting devices (16.1,16.2,16.3,16.4) have the same structure;
a hydraulic cylinder (16.11) disposed in or otherwise in communication with said first lifting device (16.1);
a lifting sleeve (16.13) disposed in or otherwise in communication with said first lifting device (16.1);
a piston rod (16.12) disposed in or otherwise in communication with said first lifting device (16.1) and connected at one end to said hydraulic cylinder (16.11) and connected at the other end to said lifting sleeve (16.13);
a transverse expanding device (16.5) disposed above or otherwise in communication with said gear rack (16.7) and disposed in or otherwise in communication with said frame (16.1) via engagement between said gear rack (16.7) and said gear (16.8) disposed at the bottom thereof, said transverse expanding device (16.4) being fixedly connected at one end to said first lifting device (16.1);
a hydraulic cylinder (16.51) disposed in or otherwise in communication with said transverse expanding device (16.5);
a piston rod (16.52) disposed in or otherwise in communication with said transverse expanding device (16.5), wherein said piston rod (16.52) is fixedly connected at one end to said hydraulic cylinder (16.51) and fixedly connected at the other end to said second lifting device (16.2); and
a connecting rod (16.6) fixedly disposed within said frame (16.10) and configured to connect said third lifting device (16.3) and said fourth lifting device (16.4);
a hydraulic system disposed within or otherwise in communication with said container (4) and configured to provide hydraulic power for said climbing-rail systems (16,16'); and
an operation platform disposed in or otherwise in communication with said steering-control chamber (3) and configured to control said climbing-rail systems (16,16') and said hydraulic system and operate by switching on or off said hydraulic system and controlling power provided by said hydraulic system for each hydraulic motor of each hydraulic cylinder.

5. The on-site laser processing vehicle for a rail of claim 1, wherein said process-operation driving system (5.1) comprises:
a speed reducer (5.12), and
a servo drive motor (5.11) connected to said speed reducer (5.12) via an elastic coupling and electrically connected to said control system (14), thereby driving said processing vehicle according to an instruction of said control system (14).

6. The on-site laser processing vehicle for a rail of claim 5, wherein said switching mechanism (5.2) switches to said process-operation driving system (5.1) for laser processing and switches back to said conventional operation driving system (5.3) after laser processing is completed, and comprises:
- an output shaft (5.24) connected to or otherwise in communication with a railway coupling-wheel system via a transmission system of said chassis (2);
- a first small gear (5.21) fixedly disposed on or otherwise in communication with an end of an output shaft of said speed reducer (5.12);
- a second small gear (5.22) fixedly disposed on or otherwise in communication with an end of an output shaft of said conventional operation driving system (5.3); and
- a large gear (5.23) movably disposed on or otherwise in communication with said output shaft (5.24) and capable of sliding thereon, wherein said large gear (5.23) is configured to be controlled by said control system (14) to slide to one side on said output shaft (5.24) and to be engaged with said first small gear (5.21) to begin laser processing and to slide to the other side on said output shaft (5.24) and to be engaged with said second small gear (5.22) after laser processing is completed, thereby enabling rapid operation of said laser processing vehicle.

7. The on-site laser processing vehicle for a rail of claim 6, wherein said movement actuator (9) comprises:
- an upright column (9.1);
- a crossbeam (9.2) capable of moving up and down on said upright column (9.1) and operated by the control system (14);
- a right longitudinal stringer (9.3) capable of moving on said crossbeam (9.2) and operated by the control system (14);
- a left longitudinal stringer (9.4) fixedly disposed on or otherwise in communication with said crossbeam (9.2);
- a pair of ball screws and nuts disposed within or otherwise in communication with each of said upright column (9.1), said crossbeam (9.2), said right longitudinal stringer (9.3), and said left longitudinal stringer (9.4), wherein said ball screw is driven by a servo motor;
- a laser processing head (17) disposed on or otherwise in communication with said right longitudinal stringer (9.3) and capable of moving up and down thereon and operated by the control system (14), such that, during a processing operation, the laser processing head (17) moves down until above a position to be processed on said rail along said right longitudinal stringer (9.3);
- a CCD monitoring device (18) disposed at the bottom of or otherwise in communication with said laser processing head (17) and communicatively connected to said CCD monitoring system (3.2) and operating to transfer monitored pictures to said CCD monitoring system (3.2); and
- a photoelectric displacement sensor (19) disposed on or otherwise in communication with said left longitudinal stringer (9.4) and capable of moving up and down thereon and capable of measuring a displacement variation between itself and an inner side of said rail and electrically communicating said displacement variation to said control system (14), an initial distance therebetween being a zero point; wherein
- said control system (14) instructs said movement actuator (9) to operate, such that, during a processing operation, said photoelectric displacement sensor (19) moves down to a position with a certain distance from an inner side of said rail and parallel thereto along said left longitudinal stringer (9.4), after which time said control system (14) instructs a laser group (7) to emit laser beams according to preset parameters, while said laser processing vehicle runs forward on said rail according to the preset parameters under driving of said process-operation driving system (5.1); and said control system (14) controls said right longitudinal stringer (9.3) to move on said crossbeam (9.2) according to said displacement variation, thereby ensuring that said laser processing head (17) is always accurately aligned with said position to be processed on said rail, and facilitating an accurate trajectory of said laser processing vehicle during laser processing.

8. The on-site laser processing vehicle for a rail of claim 6, wherein said laser processing head (17) is a first multiple-light-outlet-type laser processing head (17.2), comprising:
- a first holder (17.2.1);
- a second holder (17.2.2);
- a hollow shaft (17.2.3) capable of swinging disposed between or otherwise in communication with said two holders (17.2.1,17.2.2);
- a first beam splitting mirror (17.2.31) fixedly disposed within or otherwise in communication with and capable of swinging along with said hollow shaft (17.2.3) and capable of reflecting at 45 degrees and having a ratio of reflection to transmission of 1:1, wherein said first beam splitting mirror (17.2.31) operates to divide a laser beam (17.2.41) into a reflected beam (17.2.42) and a transmitted beam (17.2.43);
- a second beam splitting mirror (17.2.32) fixed disposed within or otherwise in communication with and capable of swinging along with said hollow shaft (17.2.3) and capable of reflecting at 45 degrees and having a ratio of reflection to transmission of 1:3;
- a third beam splitting mirror (17.2.33) fixedly disposed within or otherwise in communication with and capable of swinging along with said hollow shaft (17.2.3) and capable of reflecting at 45 degrees and having a ratio of reflection to transmission of 1:2;
- a fourth beam splitting mirror (17.2.34) fixedly disposed within or otherwise in communication with and capable of swinging along with said hollow shaft (17.2.3) and capable of reflecting at 45 degrees and having a ratio of reflection to transmission of 1:1; and
- a reflective mirror (17.2.35) fixedly disposed within or otherwise in communication with said hollow shaft (17.2.3) and capable of reflecting at 45 degrees;
- wherein said reflected beam (17.2.42) and said transmitted beam (17.2.43) each successively passes through said second beam splitting mirror (17.2.32), said third beam splitting mirror (17.2.33), said fourth beam splitting mirror (17.2.34) and said reflective mirror (17.2.35) to produce four laser beams with equal energy which can then be applied on said rail, thereby facilitating simultaneous scanning laser processing of said rail with multiple beams.

9. The on-site laser processing vehicle for a rail of claim 6, wherein said laser processing head (17) is a second multiple-light-outlet-type laser processing head (17.3), comprising:
- a first motor (17.3.1);
- a first motor shaft (17.3.2);
- a frame (17.3.3);
- a second motor (17.3.5) disposed on or otherwise in communication with said frame (17.3.3) and capable of swinging with respect to said first motor shaft (17.3.2);
- a hinge (17.3.6) disposed on or otherwise in communication with said frame (17.3.3) and capable of swinging with respect to said first motor shaft (17.3.2);

a strut (17.3.7) disposed on or otherwise in communication with said frame (17.3.3) and capable of swinging with respect to said first motor shaft (17.3.2) and said hinge (17.3.6);

a cam (17.3.4) disposed on or otherwise in communication with said frame (17.3.3) and driven by said first motor (17.3.1) in said frame (17.3.3) via said first motor shaft (17.3.2) and driven by said second motor (17.3.5) to rotate around an output shaft of said second motor (17.3.5); and a processing head frame (17.3.8) disposed on or otherwise in communication with said frame (17.3.3) and disposed at one end of said strut (17.3.7) and capable of swinging with respect to said first motor shaft (17.3.2) and said hinge (17.3.6), said processing head frame (17.3.8) comprising:

two collimating and focusing mirror systems (17.3.81);

two light outlet groups (17.3.83) having one or more light outlets, wherein each group is itself grouped with a collimating and focusing mirror system (17.3.81); and a supporting frame (17.3.82) for supporting and installing the collimating and focusing mirror systems (17.3.81) and light outlet groups (17.3.81), thereby facilitating simultaneous laser processing with multiple beams.

10. The on-site laser processing vehicle for a rail of claim 6, wherein said laser processing head (17) is a mechanical laser processing head (17.1) comprising:

a servo motor (17.1.1);

a second reflective mirror (17.1.2) disposed on or otherwise in communication with an output shaft of said servo motor (17.1.1) and driven by said servo motor (17.1.1) to swing; and a third reflective mirror (17.1.3) fixedly disposed on or otherwise in communication with a frame of said mechanical laser processing head (17.1) thereby allowing said mechanical laser processing head (17.1) to facilitate scanning laser processing of said rail with a single beam.

11. The on-site laser processing vehicle for a rail of claim 10, wherein said movement actuator (9) comprises:

an upright column (9.1);

a slide carriage (9.5);

a pair of ball screws and nuts disposed within or otherwise in communication with said upright column (9.1) and wherein said ball screws are driven by said servo motor; and an industrial robot (9.6) disposed on said slide carriage (9.5) capable of moving up and down along said upright column (9.1) along with said slide carriage (9.5) and having said laser processing head (17) disposed on or otherwise associated with one end of said industrial robot, and a CCD monitoring device (18) disposed at the bottom of or otherwise associated with said laser processing head (17); wherein said control system operates to control said industrial robot by controlling said slide carriage (9.5) of said movement actuator (9) and said industrial robot (9.6) to move downwards along said upright column (9.1) to an appropriate position, thereby adjusting said laser processing head (17) to an appropriate processing position and facilitating laser processing of a rail surface.

12. The on-site laser processing vehicle for a rail of claim 5, wherein said movement actuator (9) can be a conventional numerical controlled machine tool and/or a multi-axis industrial robot.

* * * * *